United States Patent Office 3,027,279
Patented Mar. 27, 1962

3,027,279
ELECTRICAL INSULATING RESIN
Kurt A. Kurka, Roseville, and Herbert M. Bond, Maplewood, Minn., assignors to Minnesota Mining and Manufacturing Company, St. Paul, Minn., a corporation of Delaware
No Drawing. Filed Aug. 18, 1959, Ser. No. 834,407
11 Claims. (Cl. 117—232)

This invention relates to resins which provide electrical insulation in a variety of forms, such as insulating coatings for wires or tubing, preformed insulating films, saturants for paper or fabric as insulating tape and sheeting, casting resins, and the like. Of particular importance are resins which cure to a strong, tough, heat-resistant, but highly flexible state. The novel resins also have nonelectrical uses, e.g., as waterproofing saturants for canvas.

The ideal electrical insulating resin is strongly adherent to the variety of materials found in electrical components, when cured in contact therewith; is sufficiently tough and flexible to withstand severe mechanical and thermal shock; is resistant to water, organic solvents, transformer oils, etc.; has high strength over a wide range of temperatures; and does not deteriorate under conditions of use. In addition, the uncured or partially cured resin preferably is adaptable to prolonged storage without becoming infusible or insoluble and may thus be conveniently distributed in usual commercial channels. While a host of synthetic resins possess some of these characteristics, none has heretofore been satisfactory in every respect.

This invention concerns the discovery of a class of electrical insulating resins which possesses each of the aforemention desirable properties. Nevertheless, it is comparable in cost to ordinary insulating resins. The novel electrical insulating resin comprises two essential ingredients, one of which is a branched-chain, acid-terminated polyester of dicarboxylic acid, dihydroxy alcohol and either a polyhydric alcohol having at least three nontertiary hydroxyl groups or a polybasic acid having at least three carboxyl groups. Not more than one-half of the total of said acids and alcohols include aromatic rings. In other words, not more than one-half of the monomeric residues of acid and alcohol making up the polyester include aromatic rings.

The polyester contains an average of 2.1 to 3.0 carboxyl groups per molecule, has an acid number of 15–125, and a hydroxyl number of less than 10. Accordingly, its number average molecular weight $\overline{M}_n$ is 1500–17,000 calculated from its number average degree of polymerization $\overline{X}_n$ of 10–100. The skeletal chain is essentially free from ethylenic unsaturation which would otherwise deleteriously affect the resistance to deterioration of the cured insulating resin. The polyester will not gel when heated in the absence of air. Preferably, its skeletal chain is essentially free from ether oxygen, the presence of which tends to make the cured products of the invention less resistant to moisture and thus less resistant to electrical breakdown, although the effect is minor if the ether oxygen is directly attached to an aromatic ring.

The other essential ingredient of the electrical insulating resin of this invention is an epoxy compound which contains at least 1.3 groups readily reactive with the carboxyl group, at least one of which groups is the oxirane group, said groups being separated by a chain of at least two carbon atoms, which chain is free from ethylenic unsaturation. Thus, if only oxirane groups are present, the oxirane oxygen atoms are separated by a chain of at least four carbon atoms. The epoxy compound preferably has little or no ether oxygen other than attached directly to aromatic rings.

Particularly useful are epoxy resins such as the diglycidyl ethers of resorcinol or bisphenol A which usually have more than 1.3 but somewhat less than 2.0 epoxy groups per average molecular weight but sometimes have more than 2.0 epoxy groups. For example, a commercially-available epoxy resin which has demonstrated utility in the practice of this invention is "Epon 1310" which is understood to be the condensation product of 1,1,2,2-tetrakis(4-hydroxyphenyl) ethane and epichlorhydrin having an average of about three glycidyl ether groups in the molecule. Also useful are monomeric polyepoxides such as limonene dioxide, dicyclopentadiene dioxide, vinylcyclohexene dioxide and 3,4-epoxy-6-methylcyclohexylmethyl-3,4-epoxy-6-methylcyclohexanecarboxylate. Reaction between the epoxy groups and the terminal carboxyl groups of the polyester, effected or at least materially assisted by the application of heat, advances the electrical insulating resin to a strong, tough, heat-resistant, essentially infusible and insoluble state.

When the electrical insulating resin consists essentially of only the branched-chain, acid-terminated polyester and the epoxy compound, these are preferably present in amounts such that approximately one epoxy group or oxirane oxygen is present for each carboxyl group in the polyester. If a large excess of one group is present, the cured product may be deficient in strength and other properties. The presence of other materials in the composition may have a profound effect upon the preferred proportion of epoxy and carboxyl groups. For instance, the presence of an agent which catalyzes the reaction of one epoxy group with another could enable a substantial excess of epoxy groups to be present in the original composition without ill effect on the cured products. Likewise, the composition may contain a cross-linker for epoxy resin such as a polycarboxylic acid anhydride, in which case the acid-terminated polyester might be present in very small proportion, acting as a toughening component.

For uses requiring fairly rapid curing of the novel insulating resins, an agent which catalyzes the reaction between epoxy and carboxyl groups may be incorporated into the composition. Especially preferred are tertiary amines and salts thereof. These are particularly effective in an amount of about 0.1–2% of the total weight of the composition, but in some cases up to about 5% may be employed. With proper selection of catalyst, the composition may cure in a short time at room temperature or may be stable for months.

The presence of aromatic rings in the carboxyl-terminated polyester and/or the epoxy compound enhances the toughness, thermal stability and electrical insulating properties of the cured product, but decreases its flexibility. Their presence also increases the viscosity of the uncured composition. The determination of aromatic content in our novel insulating resin composition thus depends upon the uses for which it is intended. If a premium is placed on low viscosity in use as a casting resin to enable thorough saturation of an electrical component or if the cured resin must remain flexible at very low temperatures, the composition may be free from aromatic rings. However, at least 2 percent and preferably more than 5 percent of the monomeric residues of acid and alcohol making up the polyester should include aromatic rings if the cured resin is to have good electrical insulating values, and an even higher percentage is desirable if the oxirane-containing compound is aliphatic. On the other hand, not more than 50 percent and preferably less than 35 percent of said monomeric residues include aromatic rings if the cured product is to qualify as a flexible resin, in which category its major commercial value lies. Somewhat higher aromatic content in the polyester is permissible if the epoxy compound is aliphatic.

The branched-chain, acid-terminated polyesters, in which from 2 to 50 mol percent of the total acids and alcohols making up the polyesters contain aromatic rings, are thought to be novel and patentable per se.

For uses requiring particularly high flexibility in the cured product, monoepoxides may be blended into our electrical insulating resin composition in amounts up to about equal molar ratio with the polyepoxides, but not in such large amounts that the blend does not readily cure to a tough, essentially infusible, insoluble state. Typical useful monoepoxides are dodecene oxide, octylene oxide, dipentene monoxide, alpha-pinene oxide, styrene oxide, phenyl glycidyl ether, vinylcyclohexenemonoxide, and epoxidized long-chain olefins, e.g. of 16–18 carbon atoms.

The branched-chain, acid-terminated polyester must contain an average of at least 2.1 carboxyl groups per molecule for it to be suitably hardened by reaction with the oxirane-containing compound to an infusible, insoluble state. Preferably the average should exceed 2.2 carboxyl groups to achieve high strength and toughness in the cured product. If the polyester was prepared using trifunctional acid or alcohol, the average number of carboxyl groups should not exceed about 3.0, or the polyester tends to gel prematurely to an unusable state. When tetrafunctional acid or alcohol is used, the average number of carboxyl groups should not exceed about 2.3 if premature gelation is to be avoided. With acids and alcohols of still higher functionality, the average number of free carboxyl groups per molecule must be further reduced, but in no event to less than 2.1.

If the polyester has an acid number of less than about 15, in which case its number average molecular weight exceeds about 17,000 calculated from its number average degree of polymerization of above about 100, the rate of reaction with the epoxy compound is slow and the reaction product might not be fully cured to a tough, infusible, insoluble state, even if heated for a long period. If the acid number is greater than about 125, in which case its number average molecular weight is less than about 1500 calculated from its number average degree of polymerization of less than about 10, the cured product is harder and less flexible than is desired for most purposes. Moreover, the composition would contain a higher weight proportion of the epoxy compound which is usually much higher in cost than the acid-terminated polyester.

The hydroxyl number of polyester should not exceed 10 and preferably is less than 5. A larger hydroxyl number indicates incomplete reaction between the acid and alcohol components of the polyester, in which event the products of reaction with the epoxy compound are of relatively poor quality.

Preparation and properties of typical branched-chain, acid-terminated polyesters are described below.

POLYESTER A

This polyester was formed by the hot melt fusion process in an inert atmosphere using a three-neck glass flask fitted with stirrer, thermometer, gas inlet tube and barret trap. Between the flask and the barret trap was a steam heated column packed with glass helices. The flask was charged with 133 grams (0.8 mole) of isophthalic acid, 323 grams (1.6 moles) of "Isosebacic acid," 137 grams (1.8 moles) of propylene glycol, 19 grams (0.2 mole) of glycerol and 0.6 gram of triphenyl phosphite as catalyst. "Isosebacic acid" is a product of U.S. Industrial Chemicals Co., a division of National Distillers and Chemical Co., consisting by weight of 72–80% 2-ethylsuberic acid, 12–18% 2,5-diethyladipic acid, and 6–10% n-sebacic acid.

The temperature was slowly raised to 230° C., with the water of condensation which began to form at 130° C. removed continuously by a stream of nitrogen. After more than two hours, when little water was being removed, a vacuum was applied to reduce the pressure to less than 10 mm. of mercury for an additional hour with continued heating at 200–230° C. The reaction was discontinued when the acid number reached 63. The product, hereinafter referred to as Polyester A, had a number average molecular weight of 4600 calculated from a number average degree of polymerization of 20, and contained an average of about 3.0 carboxyl groups per molecule. The viscosity of the polyester at 65° C. was 40,000 centipoises. Its equivalent weight based on carboxyl groups was 890.

POLYESTER B

A 170-gallon stainless steel kettle equipped with a cooled column packed with Berl saddles leading to a condenser was charged with 547 pounds of adipic acid, 224 pounds of isophthalic acid, 317 pounds of propylene glycol, 43 pounds of trimethylolpropane and 768 grams of triphenyl phosphite. The temperature was slowly raised using a heated oil bath to 230° C., and heating was continued for several hours, during which time the water of condensation was removed by a stream of nitrogen, until the acid number reached 80. A vacuum of 10 mm. or below was applied, otherwise continuing the same reaction conditions, until an acid number of 55 was reached. This branched-chain, acid-terminated Polyester B had a hydroxyl number of 1.0, a number average molecular weight of 6000 calculated from a number average degree of polymerization of 30, and contained an average of 3.0 carboxyl groups per molecule.

POLYESTER C

This polyester was prepared in the manner of Polyester A using 1416 grams (7.0 moles) of "Isosebacic acid," 399 grams (5.09 moles) of propylene glycol, 85.2 grams (0.64 mole) of trimethylolpropane and 2.9 grams of triphenyl phosphite. It had an acid number of 62, a number average molecular weight of 4800 calculated from a number average degree of polymerization of 20, and contained an average of about 3.0 carboxyl groups per molecule. The bulk viscosity of the polyester was 56,500 centipoises at 23° C.

POLYESTER D

This polyester was prepared from 2.0 moles "Isosebacic acid," 1.3 moles neopentyl glycol, 0.17 mole of trimethylolpropane and 0.2% (based on total charge) of paratoluene sulfonic acid as catalyst by the same procedure as Polyester A. It had an acid number of 125, a number average molecular weight of 2600 calculated from a number average degree of polymerization of 10, and contained an average of 2.5 carboxyl groups per molecule.

POLYESTER E

A mixture of 596 grams (4.08 moles) of adipic acid, 983.5 grams (5.92 moles) of isophthalic acid, 687.2 grams (9.03 moles) of propylene glycol, 43.2 grams (0.32 mole) of trimethylolpropane and 2.3 grams triphenyl phosphite was reacted as in the preparation of Polyester A to an acid number of 27. The hydroxyl number was 4, number average molecular weight was about 12,000 calculated from a number average degree of polymerization of about 60, and there was an average of 3.0 carboxyl groups per molecule. The equivalent weight based on carboxyl groups was 2060, and the viscosity of an 85 percent solids toluene solution was 16,000 centipoises at 60° C.

POLYESTER F

A mixture of 505 grams (2.5 moles) of "Isosebacic acid," 415 grams (2.5 moles) of isophthalic acid, 308 grams (4.0 moles) of propylene glycol, 40 grams (0.30 mole) of trimethylolpropane and 1.2 grams triphenyl-phosphite was reacted as in the preparation of Polyester A to an acid number of 55.5. The hydroxyl number was 4, number average molecular weight was 6800 calculated from a number average degree of polymerization of 30, and there was an average of 3.0 carboxyl groups per molecule. The equivalent weight based on carboxyl groups was 1010.

Illustrative compositions of our invention are described in the following examples, in the first of which is employed a typical epoxy resin which is marketed commercially as "Epon 828." This resin is a condensation product of epichlorhydrin and bisphenol A, has a Durrans' softening point of about 10° C. and an epoxide equivalent of about 190.

*Example 1*

A mixture of 326 grams of Polyester A, 84 grams of liquid epoxy resin, 8 grams of tris(2,4,6-dimethylaminomethyl)phenol (DMP-30) was diluted with toluene to 70 percent solids and knife-coated on low-adhesion sheet material which was then placed for two hours in an oven which had been preheated to 120° C. This cured the mixture to provide a flexible, tack-free film 8 mils (0.008 inch) in thickness which, after cooling, was peeled from the low-adhesion material. The cured film had the following electrical characteristics:

Dielectric strength, volts/mil _____ 860
Volume resistivity, ohm-cm. _____ $2.5 \times 10^{12}$
Dissipation factor _____ 0.083
Dielectric constant _____ 5.98

The last three values were measured at 30° C. and at 60 cycles per second. A strip of the film lost only 11% in weight when soaked in acetone for 24 hours at room temperature. The electrical properties and solvent resistance of this film are excellent.

A ¾-inch strip of the cured film was tested on the Instron tensile tester at an initial jaw separation of one inch and a crosshead speed of one inch per minute, evidencing a tensile strength of 360 pounds per square inch with an elongation at break of 250%. The low strength indicated that this particular cured polyester film would be more useful as electrical insulation if reinforced. Accordingly, another portion of the uncured mixture was knife-coated to saturate a web of haphazardly distributed polyethylene terephthalate fibers, some of which had been tensilized by drawing. The non-tensilized fibers were fused at their crossing points to give the web good integrity. The weight of the uncoated web was 30 grams per square yard. The coated web was cured at 95° C. for one hour and then at 150° C. for two hours to provide a strong, flexible, reinforced electrical insulating sheet.

This reinforced sheet was converted into pressure-sensitive adhesive tape for electrical insulating purposes by smoothing out one surface and then applying thereto a low-adhesion backsize coating, after which a rubber-resin pressure-sensitive adhesive coating was applied over a primer coating on the other side. The coated reinforced film was slit to narrow widths and wound upon itself in roll form for storage.

*Example 2*

A mixture of 475 pounds of Polyester B and 103 pounds of liquid epoxy resin ("Epon 828") diluted to 90% solids with toluene was heated at reflux for 4 hours, at which time the bulk viscosity of the partially-reacted mixture was 13,000 centipoises at 65° C. To this was added 11.5 pounds of tris(2,4,6-dimethylaminomethyl)phenol and additional toluene to dilute to 40% solids. Lightweight, highly porous cloth woven of glass filaments was passed through the solution, with the excess removed by a pair of metering bars, followed by heating for 12 minutes at 260° C. to produce a flexible, tack-free, insulating sheet about 5 mils in thickness.

The dielectric strength of this reinforced insulating sheet was 600 volts per mil. A strip of the insulating sheet lost only 7% in weight when soaked in toluene for 24 hours at room temperature, and another strip absorbed only 0.5% its weight when soaked in water 24 hours at room temperature.

A pressure-sensitive adhesive coating has been applied to the reinforced insulating sheet to provide a flexible electrical insulating tape for wrapping around wire splices and the like.

*Example 3*

One hundred grams of liquid epoxy resin ("Epon 828") were added to 451 grams of Polyester C to provide a mixture of 26,000 centipoises bulk viscosity at 23° C. Thirteen grams of tris(2,4,6-dimethylaminomethyl)-phenol were added to the mixture which was then poured into an aluminum mold containing the thermal shock insert described in "Thermal Shock Tests for Casting Resins," a paper presented by M. Olyphant to the "First National Conference on the Application of Electrical Insulation" at Cleveland, Ohio, September 3–5, 1958. A tough, adherent, rubbery casting was obtained after two hours in an oven at 150° C.

The cured sample was heated in an oven to 130° C. for 10 minutes and then plunged into a liquid bath at −55° C., but did not crack. The test was repeated nine more times, with just enough delay to allow inspection of the sample for cracks after each cold immersion, but no crack developed. The temperature of the bath was lowered to −70° C., but the sample did not crack. Then the sample was warmed to 25° C. and plunged into liquid air at −190° C. but did not crack, at which time tests were discontinued. This extraordinary resistance to thermal shock indicates that the composition of this example should be particularly well adapted for use in encapsulating electrical components which are exposed to wide ranges of temperature.

*Example 4*

Natural mica platelets obtained using the process taught in Bardet Patent No. 2,549,880 were formed into a reconstituted mica paper product by means of a conventional Fourdrinier papermaking machine. In this process, a slurry of mica platelets, which have an average thickness of a few microns and surface dimensions of 10 to 100 or more times their thickness, are coated out on the screen of the Fourdrinier machine, and a large amount of the water withdrawn from the coated layer by suction. The resulting sheet product is passed over steam-heated drying rollers at a temperature of about 150° C. and then wound into a roll for storage.

A two-mil thick sheet of this mica paper and 1.0 to 1.5-mil thick, loosely woven glass cloth were passed through a 50% solution of the composition of Example 3 in toluene, with excess resin removed at an orifice formed between a plate and a metering bar. After drying for 4 minutes at 95° C. followed by 10 minutes at 115° C., a partially-cured, electrical-insulating, laminated sheet of 10 mils thickness was obtained. When fully cured, the laminated sheet had a dielectric strength of 945 volts per mil, dielectric constant of 2.84, dissipation factor of 0.052, and volume resistivity of $7.2 \times 10^{13}$ ohm–cm. (the last three values being measured at 24° C. and 100 cycles per second).

The partially-cured sheet product of this example has been wound around electrical components and then heated to fuse and cure the resin to provide well-bonded insulation of superior dielectric strength and resistance to high temperatures.

*Example 5*

A mixture of 100 parts by weight of liquid epoxy resin ("Epon 828") and 170 parts of Polyester D had a bulk viscosity of 14,300 centipoises at 23° C. After 3.7 parts of tris(2,4,6-dimethylaminomethyl)phenol was added, heating at 130° C. for 2 hours produced a very rubbery, tough casting. The composition of this example is particularly useful for the encapsulation of electrical devices.

Example 6

Used in this example was a solid epoxy resin condensation product of epichlorhydrin and bisphenol A having a Durrans' softening point of about 70° C., and an epoxide equivalent of about 490, specifically "Epon No. 1001."

Fifty-two grams of this epoxy resin and 206 grams of Polyester E were reacted to a bulk viscosity of 17,500 centipoises measured at 85% solids and 60° C. This partially-reacted resin mixture was diluted to 70% solids with toluene and applied in several layers to #18 copper wire. After application of each layer, the coated wire was exposed to 400° C. for 2 minutes. The final insulation thickness was 1.6 mils.

The insulation was subjected to a number of tests. For example, when a section of wire was elongated rapidly until it broke, the insulation necked down with and broke cleanly with the wire. Another section of wire withstood 10 minutes in a boiling solution of equal parts by volume of ethanol and toluene before the insulation blistered or lifted. A twisted pair of sections of the wire subjected to a voltage increase of 500 volts per second did not break down until 8000 volts.

Example 7

A solid epoxy resin condensation product of epichlorhydrin and bisphenol A was used in this example, which resin had a Durrans' softening point of about 43° C., and an epoxide equivalent of about 345, specifically Epon No. 864.

To 1010 grams of Polyester F which had been diluted to 90% solids with toluene was added 375 grams of solid epoxy resin, also diluted to 90% solids. This mixture was heated at 150° C. until the bulk viscosity measured at 82° C. reached 14,000 centipoises. The mixture was cooled, diluted to 80% solids with toluene, and applied by a knife-coater to saturate loosely-woven glass cloth of 4-mil thickness. After drying 2.5 minutes at 80° C. followed by four minutes at 175° C. to partially cure the mixture, the resin-treated cloth was joined to polyethylene-coated paper and wound into roll form. The treated cloth at this stage was slightly tacky, very flexible, and the resin-treatment was 90% soluble in toluene at this stage of cure.

One-inch wide tapes cut from the roll were wound onto a copper coil, half lapped. The tape was extensively fused and strongly bonded to itself and to the copper after one hour in an oven at 150° C. Its dielectric strength was 1000 volts per mil. The tape insulation exhibited excellent resistance to transformer oils and to a variety of solvents such as toluene, heptane, and VMP naphtha.

A roll of the resin-treated glass cloth was stored for 9 months at room temperatures but was still very flexible. When wrapped on a copper coil and cured for one hour at 150° C., it provided electrical insulation equal to that attained with freshly prepared tape.

Example 8

To a 70% solids solution in toluene of the partially reacted mixture of Polyester F and solid epoxy resin of Example 7 was added one percent based on resin solids of tris(2,4,6-dimethylaminomethyl)phenol. This was knife-coated through a 10-mil orifice onto a 2-mil biaxially-tensilized polyethylene terephthalate carrier web which was then passed through an oven at 65° C. for 10 minutes and 80° C. for another 10 minutes to render the coated film essentially solvent-free. Further heating for 10 minutes at 120° C. plus 15 minutes at 150° C. cured the film so that it could be stripped from the carrier web. The strong, flexible, elastic, transparent, bubble-free, pinhole-free unsupported film had the following properties:

| | |
|---|---|
| Specific gravity, gm./cm.³ | 1.14 |
| Thickness, mils | 5 |
| Tensile strength (tested as in Example 1), p.s.i. | 3100 |
| Elongation at break, percent | 240 |
| Percent dissolved after 24 hours in acetone at 25° C. | 15 |
| Water absorption (in 24 hours at 25° C.), percent | 1.4 |
| Dielectric strength, volts/mil | 1400 |
| Dissipation factor (at 100 c.p.s., 30° C.) | 0.006 |
| Dielectric constant (at 100 c.p.s., 30° C.) | 4.7 |
| Volume resistivity (at 30° C., 50% R.H.), ohms-cm. | $4 \times 10^{12}$ |
| Surface resistivity (at 30° C., 50% R.H.), ohms | $2 \times 10^{13}$ |

A sheet of the cured film was suspended in an air-circulating oven for 500 hours at 135° C. and then re-tested as follows:

| | |
|---|---|
| Tensile strength, p.s.i. | 3000 |
| Elongation at break, percent | 160 |
| Weight loss, percent | 1.5 |

The unsupported film of this example is equivalent to plasticized polyvinyl chloride film in strength, stretchability and recovery from a stretched condition and so is particularly adapted, when provided with a pressure-sensitive adhesive coating, for use as electrical insulating tape. In electrical properties and particularly in resistance to high temperatures, the film of this example is much superior to plasticized vinyl chloride film.

Example 9

To 111 parts of the partially-reacted, 90% solids mixture of Polyester B and epoxy resin of Example 2 was added 1 part of diethylenetriamine, 4 parts of iron oxide red pigment ("Mapico Red 197"), and 125 parts of toluene. Loosely woven glass cloth of 4-mil thickness (Hess Goldsmith No. 16) was passed through the solution, with the excess removed by a pair of metering bars, followed by heating for 3 minutes at 95° C. and then 6 minutes at 245° C. to fully cure the resin. A second coating of the same resin mixture was applied and cured in the same manner to provide a cured impregnating resin layer of 0.85 grain per square inch which was only 15% soluble in toluene. The cured sheet was then passed through a solution of 111 parts of the partially-reacted, 90% solids mixture of Example 7, 0.1 part diethylenetriamine, 1.5 parts silica powder ("Cabosil"), 4 parts of iron oxide red pigment, and 155 parts of toluene. After the excess was removed by the metering bars, the sheet was heated for 2 minutes at 95° C. followed by 4 minutes at 140° C. to partially cure the surface resin layers. The partially-cured surface layers weighed 0.55 grain per square inch and were 60% soluble in toluene. The total thickness of the sheet was 6.8 mils.

This sheet product was slit to 1-inch width and applied to a copper bus bar, half lapped. Heating for one hour at 150° C. fused and fully cured the resin to provide excellent electrical insulation which showed no evidence of copper corrosion after long exposure to high humidity at 100° C.

Cured strips of the sheet had a dielectric strength of about 7000 volts and a resistance of 20,000–50,000 megohms.

Example 10

The oxirane groups of the epoxy compound used to cure the branched-chain, acid-terminated polyester may be replaced in part by other groups which are readily reactive with the carboxyl group, i.e., at least about as reactive as the oxirane group. Such an epoxy compound is N-(2,3-epoxypropyl)-2-ethylaziridine obtained by interacting 1,2-butyleneimine and epichlorhydrin. A mixture of 0.825 part by weight of this compound and 10.2 parts of Polyester A was knife-coated on low-adhesion material and then heated for two hours at 120° C. After cooling, the cured film of 6.5 mils thickness was removed from the carrier and tested as indicated in Example 1.

Tensile strength, p.s.i. -------------------- 172
Elongation at break, percent ---------------- 230
Dielectric strength, volts per mil ----------- 1078
Volume resistivity (at 30° C., 50% R.H.),
  ohms-cm. ------------------------------- $6.8 \times 10^{12}$
Dissipation factor (at 60 c.p.s., 30° C.) ------ 0.021
Dielectric constant (at 60 c.p.s., 30° C.) ----- 5.9
Weight loss after 24 hours in acetone at 25° C.,
  percent -------------------------------- 10.4
Water absorption (in 48 hours at 25° C.), percent 1.1

A large number of acid-terminated, branched-chain polyesters other than those used in the above examples have been reacted with oxirane-containing compounds in the practice of our invention to provide useful tough and usually flexible cured products. Among dicarboxylic acids used in making these polyesters, other than the acids specifically mentioned hereinabove are o-phthalic acid, azelaic acid, and chlorendic anhydride. Among other dihydroxy alcohols which have been used are 1,4-butane diol and ethylene glycol. Another suitable dihydroxy alcohol is 2,2 - bis[4-(2 - hydroxy-propoxy)-phenyl]propane. In addition to glycerol and trimethylolpropane as the polyfunctional compound, pentaerythritol has been used, and polycarboxylic acids such as trimesic acid, citric acid, trimellitic acid, benzene tetracarboxylic acid and tricarballylic acid also have utility.

Among epoxy compounds other than those specifically disclosed in the above examples which have been reacted with the acid-terminated, branched-chain polyesters to provide strong, tough, flexible cured resins useful as electrical insulation are epoxidized novolacs such as the resin marketed by the Borden Co. as "Epiphen 849."

In addition to those uses for the novel electrical resin of our invention disclosed hereinabove, crepe paper has been converted into high quality electrical insulating material of good solvent and moisture resistance by saturating it with the novel resin and then heating for a short time to cure the resin. Diversely, clear, tough flexible films can be produced which should be useful for general packaging purposes or in other nonelectrical applications.

What is claimed is:

1. Electrical insulating resin which is curable to a tough, heat-resistant, infusible, insoluble state, said resin comprising a blend of (1) a branched-chain, acid-terminated polyester of dicarboxylic acid, dihydroxy alcohol and a polyfunctional compound selected from the class consisting of polyhydric alcohols having at least three nontertiary hydroxyl groups and polybasic acids having at least three carboxyl groups, not more than one-half of the total of said acids and alcohols containing aromatic rings, which polyester contains an average of 2.1 to 3.0 carboxyl groups per molecule, has an acid number of 15–125, a hydroxyl number of less than 10, and is free from ethylenic unsaturation in its skeletal chain, and (2) an epoxy compound containing on the average at least 1.3 groups readily reactive with the carboxyl group, at least one of which groups is the oxirane group, said groups being separated by a chain of at least two carbon atoms, the chain being free from ethylenic unsaturation.

2. Electrical insulating resin as defined in claim 1 including up to about 5% of the total weight of ingredients (1) and (2) of tertiary amine.

3. A fibrous web saturated by the electrical insulating resin defined in claim 1.

4. Tape having as its backing member a flexible fibrous web saturated by the electrical insulating resin defined in claim 1, which resin has been cured in situ, and a surface layer of pressure-sensitive adhesive.

5. Electrically conducting wire encased in a uniformly thin layer of the electrical insulating resin defined in claim 1.

6. Self-supporting sheet material comprising reconstituted mica paper impregnated by the electrical insulating resin defined in claim 1.

7. Flexible, nonreinforced, self-supporting film produced by interreacting the ingredients of a thin layer of the electrical insulating resin defined in claim 1.

8. Tape comprising a flexible backing member as defined in claim 7 and a surface layer of pressure-sensitive adhesive.

9. Electrical insulating resin which is curable to a tough, flexible, heat-resistant, infusible, insoluble state, said resin comprising a blend of (1) a branched-chain, acid-terminated polyester of dicarboxylic acid, 10–70 mol percent of which contains aromatic rings, dihydroxy aliphatic alcohol and a polyhydric alcohol having at least three nontertiary hydroxyl groups, which polyester contains an average of 2.1 to 3.0 carboxyl groups per molecule, has an acid number of 15–125, a hydroxyl number of less than 5, is free from ethylenic unsaturation in its skeletal chain, and is free from ether oxygen other than oxygen attached directly to an aromatic ring, and (2) an epoxy compound containing at least 1.3 oxirane groups per average molecular weight, in which compound the oxirane oxygen atoms are separated by a chain of at least four carbon atoms, the chain being free from ethylenic unsaturation, and the epoxy compound being free from ether oxygen other than oxygen attached directly to an aromatic ring.

10. A branched-chain, acid-terminated polyester of dicarboxylic acid, dihydroxy alcohol and a polyfunctional compound selected from the class consisting of polyhydric alcohols having at least three nontertiary hydroxyl groups and polybasic acids having at least three carboxyl groups, 2–50 mol percent of the total of said acids and alcohols containing aromatic rings, which polyester contains an average of 2.1 to 3.0 carboxyl groups per molecule, has an acid number of 15–125, a hydroxyl number of less than 10, is free from ethylenic unsaturation in its skeletal chain, and does not gel when heated in the absence of air.

11. A branched-chain, acid-terminated polyester of dicarboxylic acid, 10–70 mol percent of which contains aromatic rings, dihydroxy aliphatic alcohol and a polyhydric alcohol having at least three nontertiary hydroxyl groups, which polyester contains an average of 2.1 to 3.0 carboxyl groups per molecule, has an acid number of 15–125, a hydroxyl number of less than 5, is free from ethylenic unsaturation in its skeletal chain, is free from ether oxygen other than oxygen attached directly to an aromatic ring, and does not gel when heated in the absence of air.

References Cited in the file of this patent

UNITED STATES PATENTS

| 2,683,131 | Cass | July 6, 1954 |
| 2,720,500 | Cody | Oct. 11, 1955 |

FOREIGN PATENTS

| 629,490 | Great Britain | Sept. 1, 1949 |
| 758,433 | Great Britain | Oct. 3, 1956 |